(No Model.)  6 Sheets—Sheet 1.

J. R. LITTLE.
MACHINE FOR UPSETTING TIRES.

No. 334,255.  Patented Jan. 12, 1886.

Witnesses:
Jas. E. Hutchinson.
Henry C. Hazard.

Inventor.
Jas. R. Little, by
Prindle and Russell, his Attys.

(No Model.)  
6 Sheets—Sheet 2.

J. R. LITTLE.
MACHINE FOR UPSETTING TIRES.

No. 334,255. Patented Jan. 12, 1886.

(No Model.) 6 Sheets—Sheet 3.

J. R. LITTLE.
MACHINE FOR UPSETTING TIRES.

No. 334,255. Patented Jan. 12, 1886.

Witnesses:
Jas. E. Hutchinson
Henry C. Hazard

Inventor.
Jas. R. Little, by
Prindle and Russell, his Attys (No Model.) 6 Sheets—Sheet 4.

J. R. LITTLE.
MACHINE FOR UPSETTING TIRES.

No. 334,255. Patented Jan. 12, 1886.

Witnesses:
Jas. E. Hutchinson.
Henry C. Hazard.

Inventor.
Jas. R. Little, by
Crindle and Russell, his attys.

(No Model.) 6 Sheets—Sheet 5.

J. R. LITTLE.
MACHINE FOR UPSETTING TIRES.

No. 334,255. Patented Jan. 12, 1886.

(No Model.)  6 Sheets—Sheet 6.

J. R. LITTLE.
MACHINE FOR UPSETTING TIRES.

No. 334,255. Patented Jan. 12, 1886.

Witnesses:
Jas. E. Hutchinson
Henry C. Hazard

Inventor:
Jas. R. Little, by
Prindle and Russell, his Attys.

UNITED STATES PATENT OFFICE.

JAMES R. LITTLE, OF QUINCY, ILLINOIS, ASSIGNOR TO THE QUINCY METAL WHEEL COMPANY, OF SAME PLACE.

MACHINE FOR UPSETTING TIRES.

SPECIFICATION forming part of Letters Patent No. 334,255, dated January 12, 1886.

Application filed September 23, 1885. Serial No. 177,921. (No model.)

*To all whom it may concern:*

Be it known that I, JAMES R. LITTLE, of Quincy, in the county of Adams, and in the State of Illinois, have invented certain Improvements in Machines for Upsetting Tires; and I do hereby declare that the following is a full, clear, and exact description thereof, reference being had to the accompanying drawings, in which—

Figure 1:
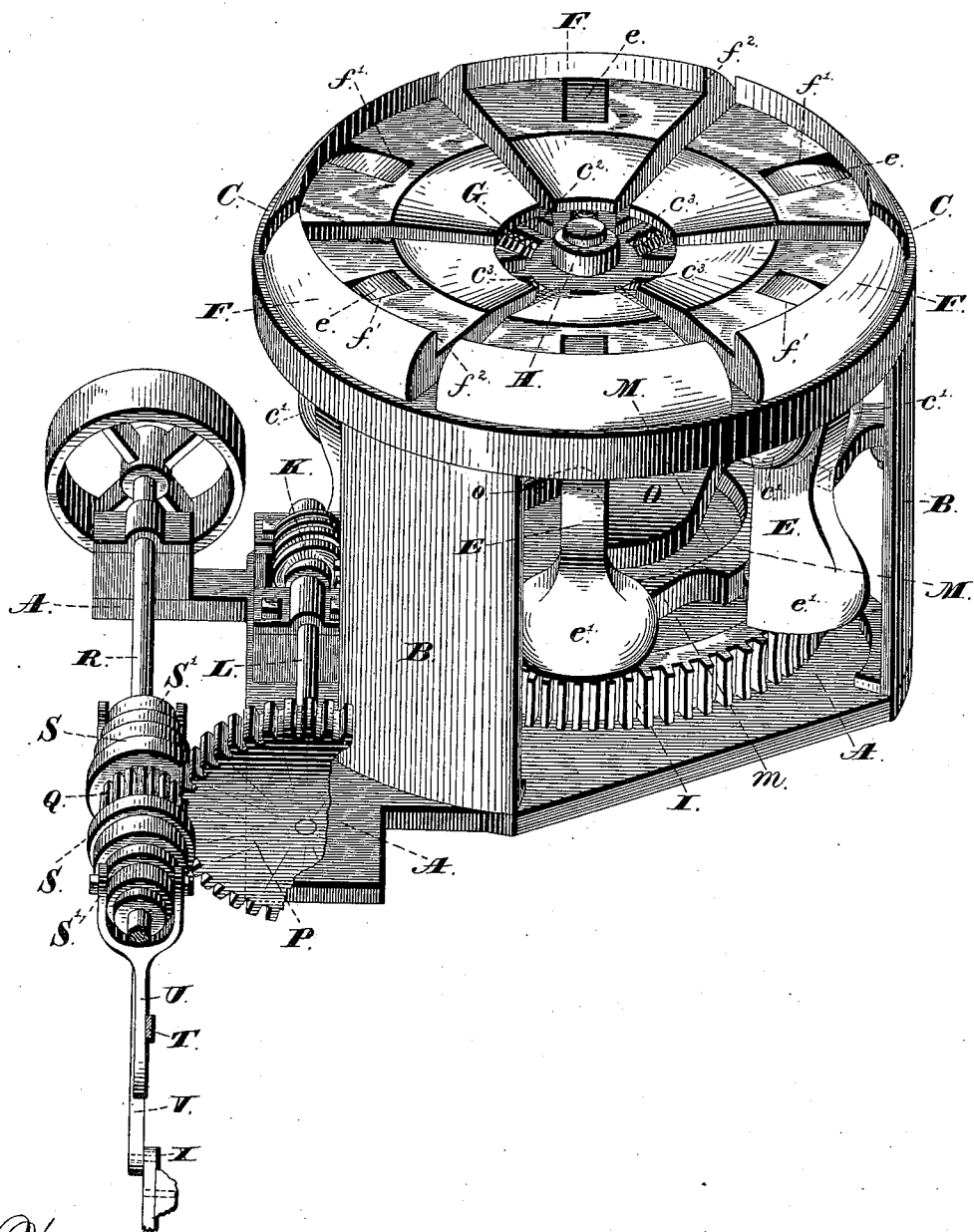
Figure 2:
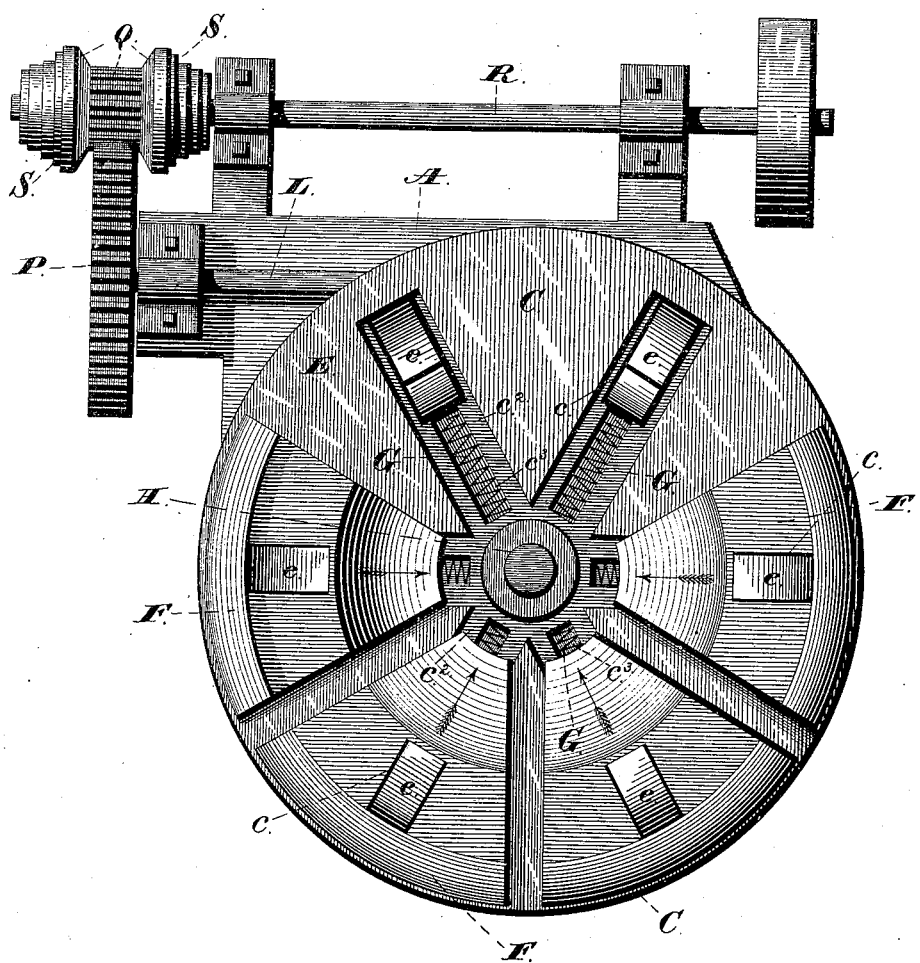
Figure 3:
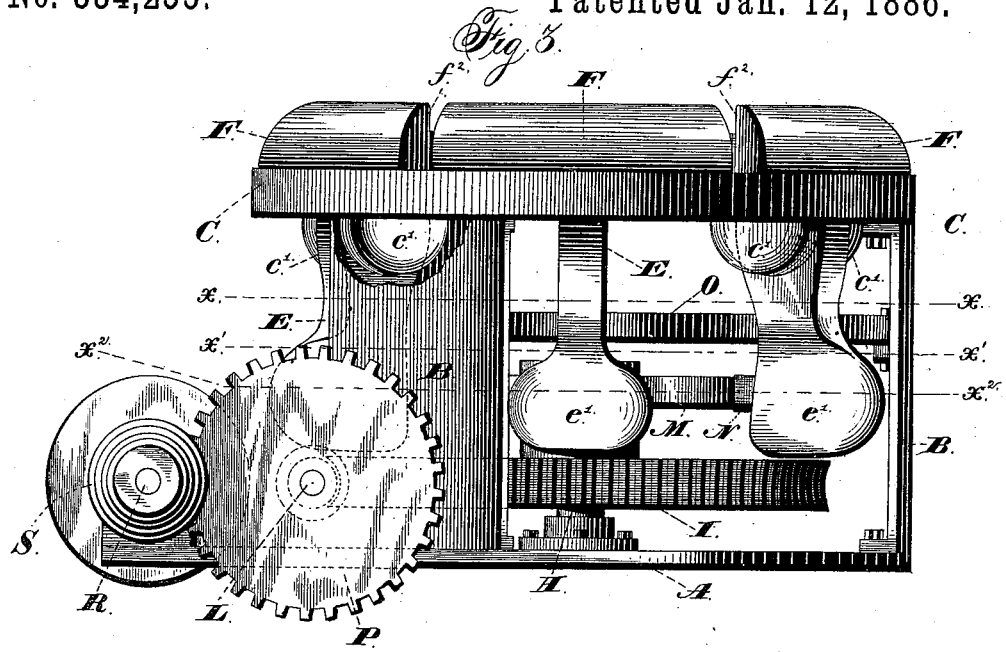
Figure 4:
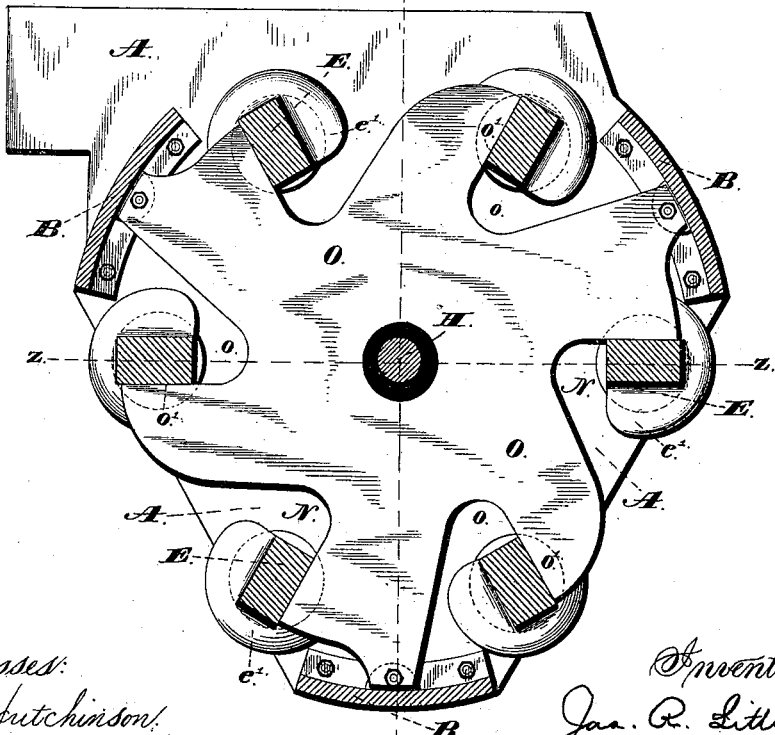
Figure 5:
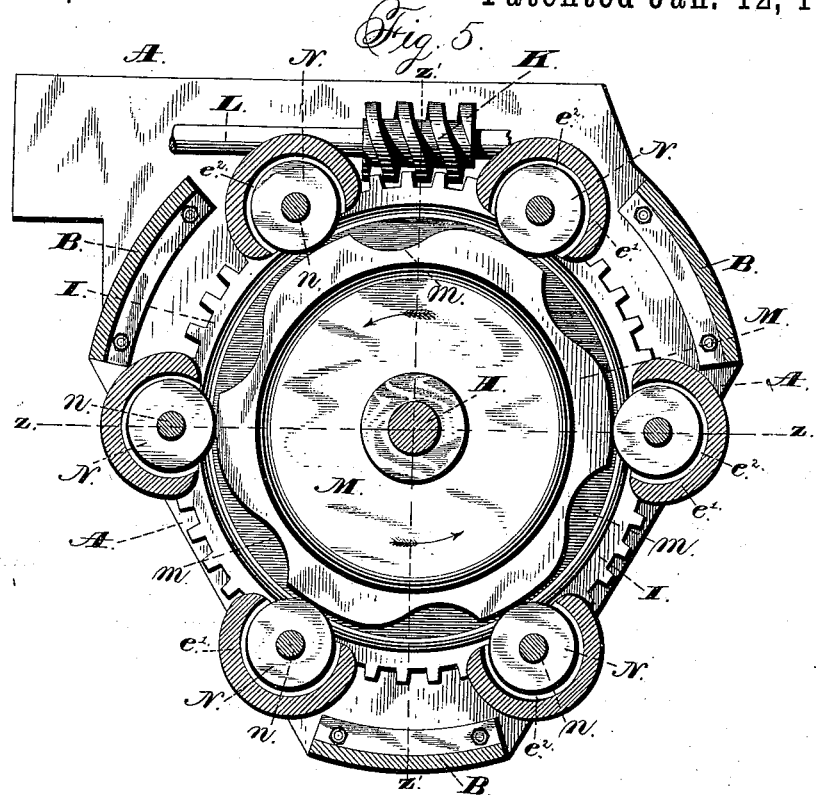
Figure 6:
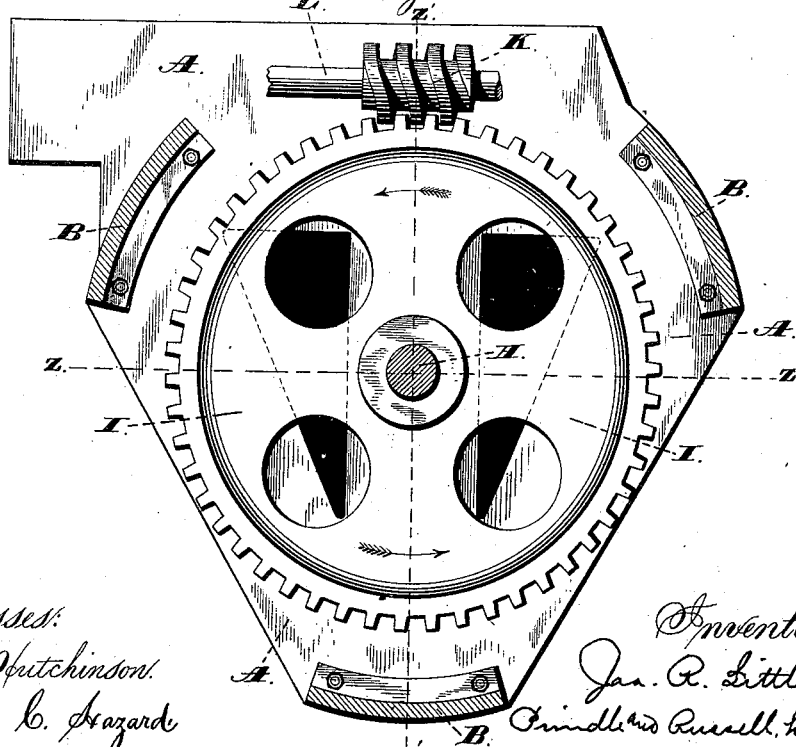
Figure 7:
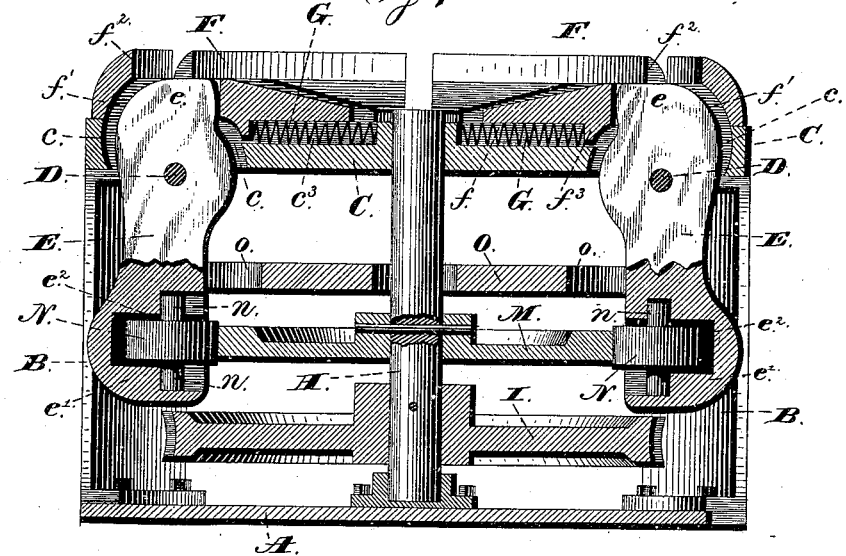
Figure 8:
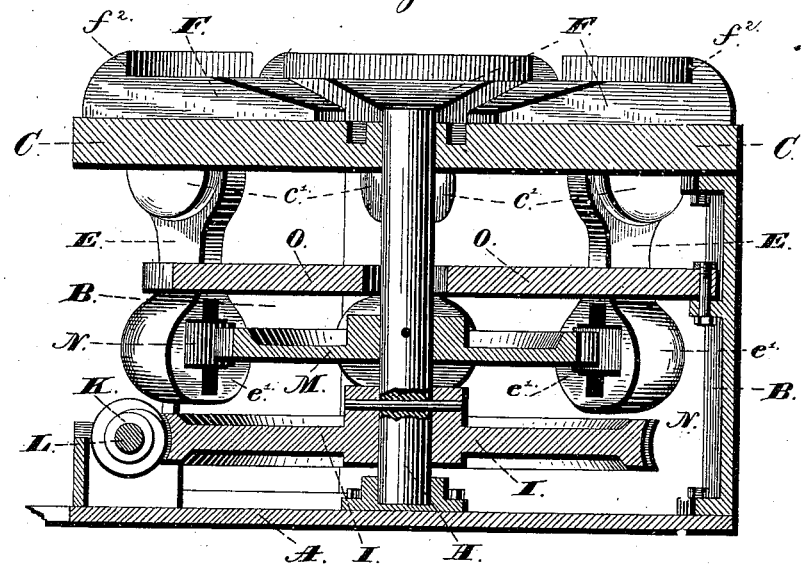
Figure 9:
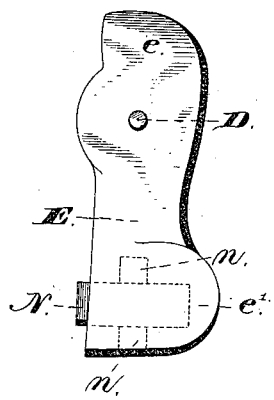
Figure 10:
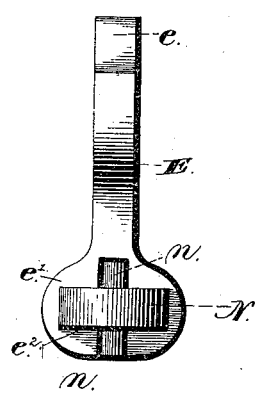
Figure 11:
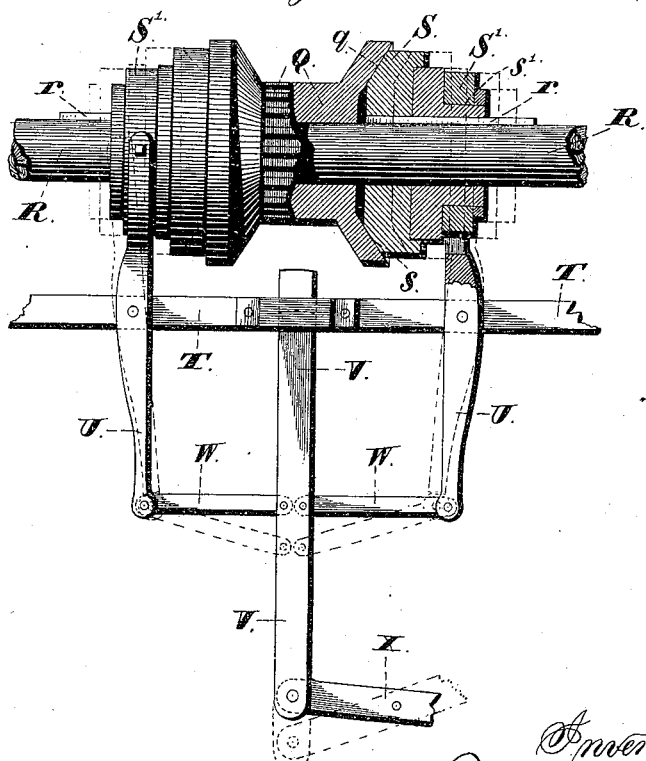

Figure 1 is a perspective view of my apparatus as arranged for use. Fig. 2 is a plan view of the same from the upper side. Fig. 3 is a side elevation of said apparatus. Figs. 4, 5, and 6 are respectively sections upon lines $x\,x$, $x'\,x'$, and $x^2\,x^2$ of Fig. 3. Figs. 7 and 8 are vertical sections upon lines $z\,z$ and $z'\,z'$, respectively, of Figs. 2, 4, 5, and 6. Fig. 9 is a side elevation of one of the clamping-levers. Fig. 10 is an elevation of the inner edge of the same; and Fig. 11 is a side elevation, partly in section, of the friction-clutches and their operating-levers.

Letters of like name and kind refer to like parts in each of the figures.

The object of my invention is to enable the rims or tires of metal wheels to be upset to size, and at the same time given the form of a true circle; to which end said invention consists, principally, in a tire-upsetting machine in which a number of jaws are arranged around a common center and adapted to be simultaneously moved upon radial lines, in combination with levers and cams, substantially as described, whereby said jaws are automatically and continuously moved between the outer and inner limits of their motion, substantially as and for the purpose hereinafter specified.

It consists, further, in a tire-upsetting machine in which a number of jaws are arranged around a common center, and adapted to be moved upon radial lines, in combination with levers and cams, substantially as described, whereby said jaws are simultaneously moved to the inner limit of their motion, where they have a period of rest, and are then returned to the outer limit of their motion, such operations being automatic and continuous, substantially as and for the purpose hereinafter shown.

It consists, further, in a tire-upsetting machine in which a number of jaws arranged around a common center are adapted to be simultaneously moved upon radial lines, in combination with levers and cams, substantially as described, whereby said jaws are slowly moved to the inner limit of their motion, then have a period of rest, and are then moved rapidly to the outer limit of their motion, such operations being repeated automatically and continuously, substantially as and for the purpose hereinafter set forth.

It consists, further, in a tire-upsetting machine in which are combined the following elements, to wit: a series of sliding jaws that are arranged around a common center and are adapted to move upon radial lines, pivoted levers which are each engaged at one end with and adapted to move one of said jaws, a cam-plate that is adapted to engage with and simultaneously move said levers upon their pivotal bearings, and means, substantially as shown, whereby said cam-plate may be caused to rotate, substantially as and for the purpose hereinafter shown and described.

It consists, further, in a tire-upsetting machine in which are combined the following elements, to wit: a series of sliding jaws that are arranged around and adapted to be moved toward or from a common center, pivoted levers which are each engaged at one end with one of said jaws, a rotating cam-plate that is adapted to impinge upon and simultaneously move said levers to cause said jaws to be moved to the inner limits of their motion and then released, and springs which are adapted to then return said jaws to the outer limits of their motion, substantially as and for the purpose hereinafter specified.

It consists, further, in a tire-upsetting machine in which are combined with a cam-plate that has a continuous rotary motion in one direction levers that are simultaneously moved upon their pivotal bearings by the cam-faces of said rotating plate, and jaws which are arranged around a common center, are engaged by said levers, and by the operation of the same are moved inward toward such center, substantially as and for the purpose hereinafter shown.

It consists, finally, in the construction and combination of the parts of the machine, substantially as and for the purpose hereinafter set forth.

In the carrying of my invention into practice I employ a base-plate, A, which has the general form of a triangle with its corners cut away, as seen in Figs. 4, 5, and 6. From each corner of said plate a post, B, extends vertically upward to a suitable height, and at its upper end is attached to and furnishes a partial support for a round flat table, C, that occupies the same horizontal plane as does said bed-plate.

Within the table C, near its outer edge, are a number of equidistant oblong slots, $c$, which are arranged upon radial lines, and upon the lower side of said table, at each side of each of said slots, is provided an ear or lug, $c'$, that, in connection with the opposite lug, $c'$, furnishes a bearing for a pivotal pin, D, which passes horizontally through the same upon a line having a right angle to the longitudinal axis of the intervening slot.

Pivoted upon each pin D is a lever, E, which has the form in side elevation shown in Figs. 7 and 9, and at its upper end projects through the slot $c$ a short distance above the table C, while below said table said lever extends about two-thirds the distance from the same to the base-plate A. Said slot $c$ has such relative proportions as to enable said lever to have a certain amount of motion upon its pivotal bearing.

From the outer end of each slot $c$ within the upper side of the table C a groove, $c^2$, having a width equal to about twice the width of said slot and a depth of about one-half inch, extends radially inward to the center of said table, while from the inner end of said slot a second narrower and deeper groove, $c^3$, extends inward nearly to the center of said table. Said grooves and slot have the same longitudinal axis, as will be seen in Fig. 2.

Upon the upper side of the table C are placed a number of segmental plates, F, each of which is located directly over one of the slots $c$ and its intersecting grooves $c^2$ and $c^3$, and is provided upon its lower face with a rib, $f$, that corresponds to and fits within said groove $c^2$, and enables said plate to be moved toward or from the center of said bed, while maintaining its lateral position thereon. A slot, $f'$, corresponding in size and shape with the horizontal dimensions of the upper projecting portion, $e$, of the lever E, receives and contains said part, and causes the movements of said lever upon its pivotal bearing D to be communicated to said plate, and to move the latter toward or from the center of the table C. Said plates have such lateral dimensions as to permit of their being moved inward the desired distance before their side edges impinge. Each segmental plate F is provided upon its upper side, around its outer edge, with an upward-extended flange or jaw, $f^2$, which has a height somewhat greater than the width of the tire to be operated upon, and in connection with the jaws $f^2$ of the other plates operates to compress such tire when said plates are moved inward by the levers E.

In practice it is found best to move the jaw-plates F outward by means of springs G, one of which is placed in each of the grooves $c^3$, with one of its ends in engagement with the inner end of the latter, and its outer end in engagement with a lug, $f^3$, that projects from the jaw-plate downward into said groove, by which arrangement said spring is compressed longitudinally as said jaw-plate is moved inward, and by longitudinal expansion moves the latter and its lever E to their outer normal position whenever said parts are free to be so moved.

The levers E are operated so as to move the jaw-plates F inward by the following-described means, viz: Journaled vertically within and at the centers of the bed-plate A and table C is a shaft, H, that is provided near its lower end with a worm-wheel, I, which latter is engaged by a worm, K, that is secured to or formed upon a horizontally-journaled shaft, L, the arrangement being such that the rotation of said shaft L will through said worm and worm-gear cause said shaft H to revolve. Upon the shaft H, above the wheel I, is secured a cam-plate, M, which is provided upon its periphery with equidistant cam-faces, $m$, that correspond in number to the levers E. Each of said faces $m$ commences with an outward and forward curve, which is followed by a portion that is concentric with the axis of said plate M, and immediately following the latter has a sharp inward and forward curve, as seen in Fig. 5. The lower end of each lever E is expanded laterally and provided within the inner face of such enlargement $e'$ with a recess, $e^2$, that receives and contains a roller, N, and its pivots or journals $n$. Said roller bears upon the face of the cam-plate M, where it is held with a yielding pressure by means of the springs G, operating through the jaw-plate F and lever E. If, now, the shaft H is caused to revolve, the cam-faces $m$ will simultaneously engage with the rollers N, and slowly move the lower ends of the levers E outward, and their upper ends, with the jaw-plates F, inward until the concentric portion of each cam is beneath its roller, after which there will be an interval of rest until the end of said concentric portion reaches said roller, when said levers and jaw-plates will be moved quickly to their normal positions by the operation of the springs G. The compressing movement of the mechanism is comparatively slow, and the period of rest enables the metal being operated upon to become set, while the opening of the jaw-plates and the release of the tire is quickly effected, so that no time is lost in the work. The operation of said mechanism is continuous, and may be as rapid as desired, the only limit being the time necessary to remove a compressed tire and replace the same by a tire to be operated upon.

In order that the levers E may be relieved from the strain caused by side-thrust of the cam-plate M, which moves at a right angle to the plane of motion of such levers, a plate, O, having the form shown in Fig. 4, is secured to and extends horizontally between the posts B. Said plate has within its periphery notches o, which correspond in number to the number of said levers, and has the side o' of each notch that is adjacent to the rear side of one of said levers formed upon a line which is parallel with the plane of motion of the latter. The radial faces o' thus formed constitute bearings for said levers E and prevent the lower portions of the latter from being moved laterally by the pressure of said cams m as said cam-plate M rotates. The shaft L is driven through a gear-wheel, P, which is attached to one of its ends, and a pinion, Q, that is placed upon a second shaft, R, which is journaled beside and parallel with said shaft L. Said pinion is loosely journaled upon its shaft, and is provided at each end with an enlarged concave face, q, which is adapted to be engaged by a correspondingly opposite or convex face, s, of a disk, S, which disk is connected with said shaft R by means of a key or feather, r, that enables the former to move lengthwise of the latter, while compelled to rotate with the same.

The disks S are simultaneously moved against or from the pinion Q by the following-described means, viz: To or upon a bar, T, which is located below and parallel with the shaft R, are pivoted two levers, U, each of which has its upper end forked, and such forked end pivoted upon a ring, S', that is fitted within a circumferential groove, s', provided within the periphery of each of said disks. Midway between the levers U is a vertical bar, V, that is adapted to be moved longitudinally, and is connected with the lower end of each of said levers by means of a bar, W, which extends between and is pivoted to said parts. Said bar V is preferably connected with one end of a foot-lever, X, by means of which it may be moved longitudinally, as before stated.

The normal position of the friction-clutch devices is shown by the dotted lines of Fig. 11, bar V being moved downward until the connecting-bars W are drawn out of line and the lower ends of the levers U drawn inward, by which means each friction-disk S' will be moved away from the pinion Q and out of contact with its friction-faces q.

When it is desired to start the machine, the outer end of the foot-lever X is depressed, whereby said bar V will be raised and said connecting-bars W moved into a line with each other, the result being that the lower ends of said levers will be forced apart, their upper ends moved toward each other, and said friction-disks caused to bear firmly against said pinion friction-faces, as seen by the full lines of said Fig. 11.

By providing jaw-plates which have the requisite dimensions the machine may be easily and quickly adapted for operation upon any desired size of tire, the other parts having capacity, without change, for all of the usual sizes of work.

For use upon the machine the tires are made somewhat larger than is required, and by the action of the radially-moving jaw-plates are compressed longitudinally until they have the predetermined exterior dimensions. The action of said compressing mechanism also tends to give to said tire a round form, and renders unnecessary such attention to shape as is usually required while welding the same. The relatively slow inward motion of the jaw-plates and their period of rest at the inner limit of their motion favor the longitudinal compression of the tire and the readjustment of the particles of the metal, after which the rapid outward movements of said jaw-plates quickly release the completed tire and economize in time, the speed of said compressing mechanism being regulated so that sufficient time is given for the removal of a completed tire and the insertion of a tire to be operated upon after the jaws commence to open and before they have closed sufficiently to impinge upon the latter. No other attention is required, as the movements are continuous and automatic.

Having thus fully set forth the nature and merits of my invention, what I claim is—

1. As an improvement in machines for upsetting tires, a number of jaws which are arranged around a common center and adapted to be simultaneously moved upon radial lines, in combination with levers and cams, substantially as described, whereby said jaws are automatically and continuously moved between the outer and inner limits of their motion, substantially as and for the purpose specified.

2. As an improvement in machines for upsetting tires, a number of jaws which are arranged around a common center and adapted to be moved upon radial lines, in combination with levers and cams, substantially as described, whereby said jaws are simultaneously moved to the inner limit of their motion, where they have a period of rest, and are then returned to the outer limit of their motion, such operation being automatic and continuous, substantially as and for the purpose shown.

3. As an improvement in machines for upsetting tires, a number of jaws arranged around a common center, which are adapted to be simultaneously moved upon radial lines, in combination with levers and cams, substantially as described, whereby said jaws are slowly moved to the inner limit of their motion, then have a period of rest, and are then moved rapidly to the outer limit of their motion, such operations being repeated automatically and continuously, substantially as and for the purpose set forth.

4. A tire-upsetting machine in which are combined the following elements, to wit: a series of sliding jaws that are arranged around a common center and are adapted to move upon radial lines, pivoted levers which are each engaged at one end with and adapted to move one of said jaws, a cam-plate that is adapted to engage with and simultaneously move said levers upon their pivotal bearings, and means, substantially as shown, whereby said cam-plate may be caused to rotate, substantially as and for the purpose shown and described.

5. A tire-upsetting machine in which are combined the following elements, to wit: a series of sliding jaws that are arranged around and adapted to be moved toward or from a common center, pivoted levers which are each engaged at one end with one of said jaws, a rotating cam-plate that is adapted to impinge upon and simultaneously move said levers to cause said jaws to be moved to the inner limits of their motion and then released, and springs which are adapted to then return said jaws to the outer limits of their motion, substantially as and for the purpose specified.

6. A tire-upsetting machine in which are combined with a cam-plate that has a continuous rotary motion in one direction levers that are simultaneously moved upon their pivotal bearings by the cam-faces of said rotating plate, and jaws which are arranged around a common center, are engaged by said levers, and by the operation of the same are moved inward toward such center, substantially as and for the purpose shown.

7. In combination with the supporting-frame of the machine, the segmental plates F, having the jaws $f^2$, the levers E, engaging with said jaw-plates, and the rotatable plate M, provided with the cam-faces $m$, substantially as and for the purpose set forth.

8. In combination with the supporting-frame of the machine, the segmental plates F, having the jaws $f^2$, the levers E, engaging with said jaw-plates and adapted to move the same inward, the rotatable plate M, provided with the cam-faces $m$, and the springs G, adapted to move said jaw-plates outward, substantially as and for the purpose shown and described.

9. The combination of the table C, provided with the slots $c$ and grooves $c^2$ and $c^3$, the levers E, pivoted within said slots, the segmental plates having each a rib, $f$, slot $f'$, jaw $f^2$, and lug $f^3$, the springs G, the cam-plate M, secured upon the rotatable shaft H, and provided with the cam-faces $m$, and the rollers N, journaled within said levers and adapted to receive the impingement of said cam-faces, substantially as and for the purpose specified.

10. In combination with the levers E, pivoted within the table C, and adapted to have the lower ends swung radially outward by means of the rotatable plate M, provided with the cam-faces $m$, the plate O, having radial faces $o'$, which furnish bearings for the rear sides of said levers, substantially as and for purpose shown.

11. As a means for swinging the levers E upon their pivotal bearings, and in combination therewith, the worm-wheel I and the plate M, having the cam-faces $m$, which are secured to and rotate with the shaft H, and the worm K, that is secured to or formed upon the shaft L, and is adapted to engage with said worm-wheel, substantially as and for the purpose set forth.

In testimony that I claim the foregoing I have hereunto set my hand this 18th day of September, 1885.

JAMES R. LITTLE.

Witnesses:
CARL E. EPLER,
THOS. J. SEEHORN.